United States Patent

Elsner

[11] Patent Number: 5,224,164
[45] Date of Patent: Jun. 29, 1993

[54] METHOD AND APPARATUS FOR TRANSLITERATING MESSAGES

[76] Inventor: Peter Elsner, Fritz-Baer-Strasse 27, D 8000 Muenchen, Fed. Rep. of Germany, 71

[21] Appl. No.: 703,157

[22] Filed: May 20, 1991

[30] Foreign Application Priority Data

May 22, 1990 [DE] Fed. Rep. of Germany ....... 4016491
May 7, 1991 [DE] Fed. Rep. of Germany ....... 4114777

[51] Int. Cl.[5] .............................. H04K 1/00
[52] U.S. Cl. ...................... 380/44; 380/23; 380/46; 380/47
[58] Field of Search ............... 380/24, 23, 25, 44, 380/45, 46, 47

[56] References Cited

U.S. PATENT DOCUMENTS

| | | | |
|---|---|---|---|
| 4,458,109 | 7/1984 | Mueller-Schloer | 380/24 |
| 4,460,992 | 7/1984 | Gutleber | 380/46 |
| 4,919,545 | 4/1990 | Yu | 380/25 |
| 5,007,016 | 4/1991 | Le Mehaute et al. | 380/46 |
| 5,150,409 | 9/1992 | Elsner | 380/23 |

FOREIGN PATENT DOCUMENTS 3827172 3/1989 Fed. Rep. of Germany .

Primary Examiner—Salvatore Cangialosi
Attorney, Agent, or Firm—W. G. Fasse

[57] ABSTRACT

It is the object of the invention to realize a low-cost, low-effort cryptoanalytically secure encrypting/decrypting method for high data rates and large code key spaces. The solution provides for a message encrypting/decrypting system whereby the keys are contained in a memory in the form of a branching network with cross-linked nodes and branches. For encrypted/decrypted data transmission by process participants, it is possible to realize the cryptological functions "authorization", "identification", "authentication", "electronic signature", "one time key", among others. The solution is especially usable in the application fields "electronic access and data securing", "telecommunication services", and "electronic bank and payment services", for example, for the cash money substitution.

36 Claims, 2 Drawing Sheets

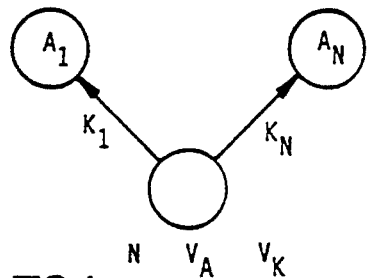
FIG.1
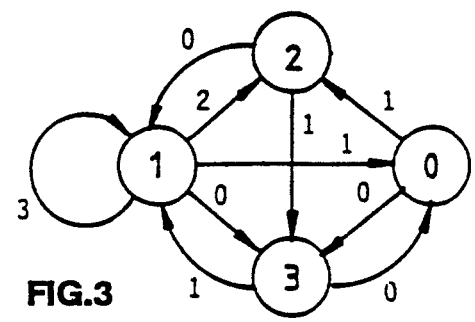
FIG.3
| NODE | N | A FOR BRANCH | | | | K FOR BRANCH | | | | $V_A$ | $V_K$ |
|---|---|---|---|---|---|---|---|---|---|---|---|
| | | 0 | 1 | 2 | 3 | 0 | 1 | 2 | 3 | | |
| 0 | 2 | 3 | 2 | - | - | 1 | 0 | - | - | 0 | 0 |
| 1 | 4 | 3 | 0 | 2 | 1 | 10 | 11 | 01 | 00 | 0 | 0 |
| 2 | 2 | 1 | 3 | - | - | 0 | 1 | - | - | 0 | 0 |
| 3 | 2 | 0 | 1 | - | - | 0 | 1 | - | - | 0 | 0 |
FIG.2
| CELL | A0 | A1 | K |
|---|---|---|---|
| 0 | 2 | 3 | 0 |
| 1 | 0 | 1 | 0 |
| 2 | 3 | 0 | 1 |
| 3 | 1 | 2 | 1 |
FIG.4
| CELL | A0 | A1 | K |
|---|---|---|---|
| 0 | 1 | 2 | 0 |
| 1 | 2 | 0 | 1 |
| 2 | 3 | 1 | 1 |
| 3 | 0 | 3 | 0 |
FIG.5
| CELL | A1 | K |
|---|---|---|
| 0 | 2 | 0 |
| 1 | 0 | 1 |
| 2 | 1 | 1 |
| 3 | 3 | 0 |
FIG.5.1
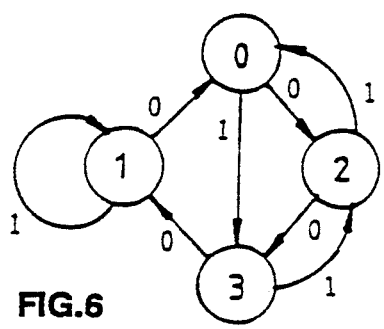
FIG.6
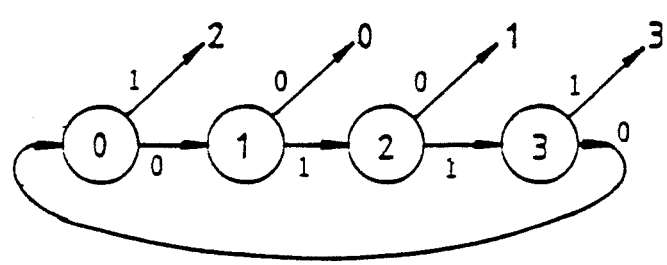
FIG.7

| SECTION | KEY | RUN-THROUGH | BIT SEQUENCE |
|---|---|---|---|
| 1 | $K0_1 \ldots K6_1$ | 1<br>2<br>3 | 3-1-2<br>2-3-1<br>$\underline{1}$-2-3 |
| 2 | $K1_2 \ldots K6_1$<br>$K0_2 = 0$ | 1<br>2 | 1-3-2<br>1-$\underline{2}$-3 |
| 3 | $K3_3 \ldots K6_1$<br>$K0_3=0$, $K1_3=0$, $K2_3=0$ | 1 | 1-2-$\underline{3}$ |

METHOD AND APPARATUS FOR TRANSLITERATING MESSAGES

CROSS-REFERENCE TO RELATED APPLICATION

The present invention relates to U.S. Ser. No. 07/458,707, filed on Jan. 19, 1990, entitled: Device for the Identification of Messages, Inventor: Peter Elsner; now U.S. Pat. No. 5,150,409.

1. Field of the Invention

The invention relates to message encrypting and decrypting and generally to the identification of messages, objects, persons, etc. including "authorization", "identification", and "authentication" of messages.

2. Background Information

The above cross-referenced U.S. Ser. No. 07/458,707, now U.S. Pat. No. 5,150,409, is based in part on German Patent Publication (DE) 3,827,172 which solves identification and encrypting/decrypting problems with a branching network that depends o random events and is made up of nodes and branches wherein input messages generate associated output messages in a nodewise serial manner along encrypting/decrypting paths, whereby the branching network is variable dependent upon events such as messages which are internal and/or external to the method. The above German Patent Publication provides a very cost-efficient, space-saving solution for the encrypting/decrypting of messages with high encrypting and decrypting capacities and data rates. However, a solution for the authorized, authenticated, encoded data transmission by process participants is not disclosed in the above German Patent Publication. Moreover, no cost optimal solution for the formation of the branching network is disclosed.

SUMMARY OF THE INVENTION

It is an object of the invention to provide a method for a cost optimal formation of branching networks and to provide by means of this method a timelessly reliable, efficient and space-saving system for an individualized process for the transmission of encoded data, which, with high encoding capacities and data rates, enables the process participants to carry out, the cryptographic functions of "authorization", "identification", "authentication", "electronic signature", and encoding with "one time code keys", among others, and which is multifunctionally usable for any desired number of processes. In this context, these functions shall satisfy very high security requirements, such as those that must be satisfied by banks and payment services. It is to be understood that in this context "process participants" include persons as well as objects, messages, etc.

This object has been achieved according to the invention by the following steps:

(a) defining said branching network as a plurality of addressable nodes, said nodes being allocated to a key information for encrypting/decrypting an input message into an output message;

(b) generating sets of target addresses for linking one node as a source node to a set of target nodes, each target address set comprising a first target address and at least one second target address;

(c) performing a selection run as a sequence of selection steps, each selection step selecting at least one target address out of a target address set on the basis of a currently active character of said input message;

(d) generating said target address sets for forming a chain of said addressable nodes by generating said first target addresses and cross-linking said node chain to said branching network by generating at least said second target addresses, said branching network carrying a key characteristic on the basis of said key information and said generated target address sets; and (e) selecting with said selection run step-by-step, said target nodes on the basis of said currently active characters of said input message, thereby selecting said allocated key information for forming an encrypted/decrypted output message.

The present system is characterized by the following features. A system for encrypting/decrypting messages comprising a branching network, memory means including addressable memory cells as nodes for forming said branching network, said memory cells being allocated to key information for encrypting/decrypting an input message into an output message; addressing means for generating target address sets, said target address set for linking one memory cell as a source cell to a set of memory cells as target cells, each target address set comprising a first target address and at least a second target address; selecting means for selecting at least one target address out of each target address set on the basis of a currently active character of said input message; said addressing means forming a chain of said memory cells, by generating said first target addresses and cross-linking said memory cell chain to a memory cell network by generating at least said second target addresses; said memory cell network carrying a key characteristic on the basis of said key information and on the basis of said generated target address sets; whereby said selecting means select said target cells in a selection run, step-by-step, on the basis of said currently active characters of said input message, thereby selecting said allocated key information for forming an encrypted/decrypted output message.

The present method and system are multi-functionally usable for all requirements regarding authorization, identification, authentication, and data encoding and is including as a substitution for cash money transactions.

BRIEF DESCRIPTION OF THE DRAWINGS

In order that the invention may be clearly understood, it will now be described, by way of example, with reference to the accompanying drawings, wherein:

FIG. 1 shows the node of the branching network;

FIGS. 2, 3 show a branching network in tabularly and graphical form;

FIGS. 4, 6 show a branching network realized by means of memory information;

FIGS. 5, 7, 5.1 show a preferred solution for a branching network realized by memory information;

Figures 8, 9:
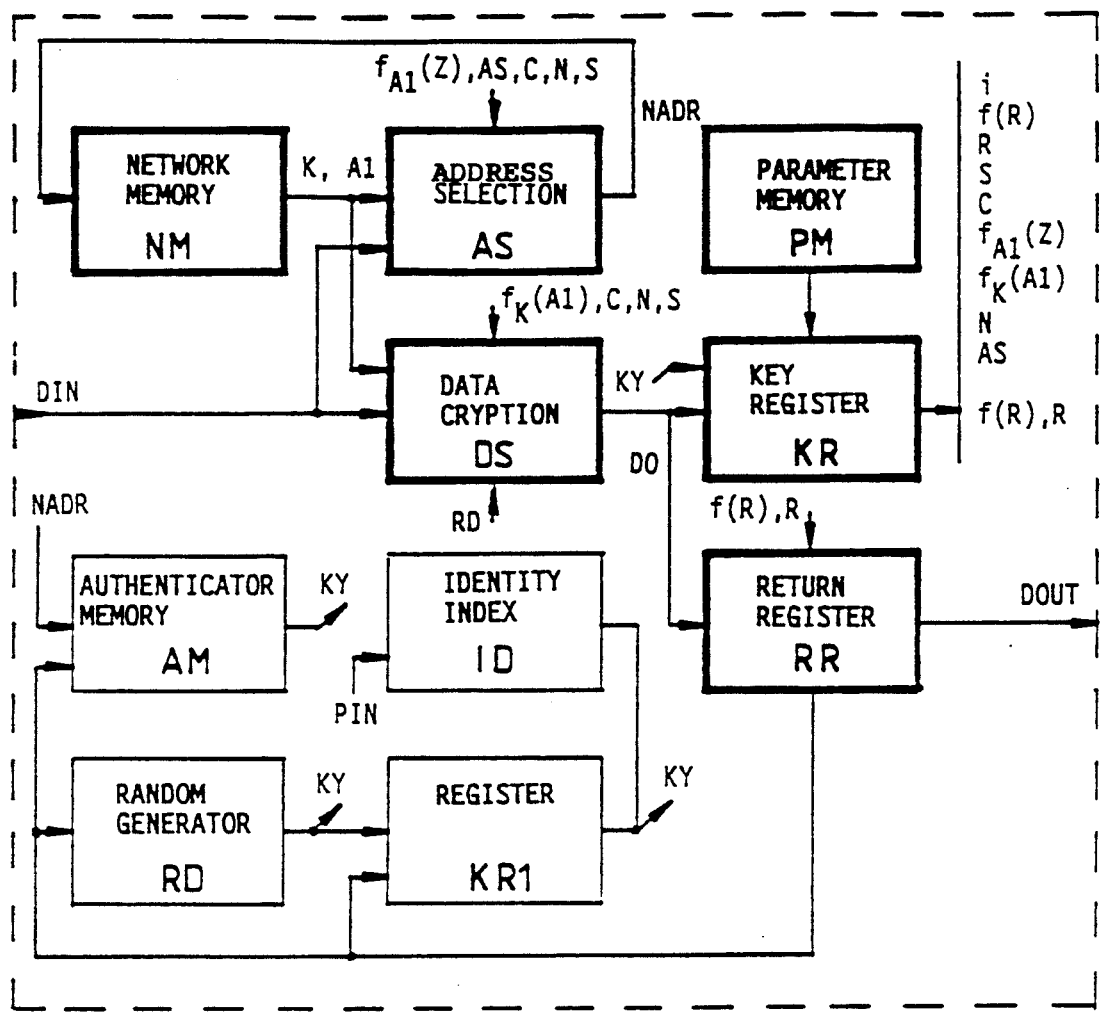
FIG. 8 shows a block circuit diagram of the present encrypting/decrypting system.
FIG. 9 shows an encrypting/decrypting procedure divided into sections, as an example.

DETAILED DESCRIPTION OF PREFERRED EXAMPLE EMBODIMENTS AND OF THE BEST MODE OF THE INVENTION

For simplifying the description, the expression "encrypting/decrypting" has the connotation of encrypting and/or decrypting including the meaning of code conversion and will be expressed as "crypting" or "cryption" or "crypted".

Referring first to FIG. 1, a NODE has the following five node-individual parameters that typify the cryption characteristics of the branching network of the invention:

1. The node index N which determines the number of branches extending from the node;
2. The target nodes A of the branches extending from a node, which determine the branching;
3. The cryption indices K of these branches or of the node, which determine the cryption code,
4. The branching vector $V_A$ of the node, which determines the counting method, that is to say the call-up sequence of the branches, for the input message.
5. The transliteration vector $V_K$ of the node, which allocates a cryption index K of the node to a particular branch.

A node of the network at which an input message is present, carries out the crypting of i bits of this input message, to form an output message by:

interpreting the coded i bits of the input message by means of its branching vectors $V_A$ as a certain branch network branch, selecting this branch from among its $N = 2^i$ branches, determining the cryption index K allocated to this branch by means of the cryption vector $V_K$, and forms the output message by means of this cryption index.

A branching network of the invention has a number of n nodes with n internal randomly generated parameters N, A, K, $V_A$ and $V_K$ to form a randomly dependent branching network. Such a branching network may be shown in a tabular form by listing all of the nodes with the respectively allocated parameters. FIG. 2 shows the general case of such a list for the branching network according to FIG. 3.

For the sake of clarity, here a branching vector $V_A = 0$ was selected for all nodes. Stated differently, each node relates the input message to the sequence of the branches already determined in the list, a "00" onto branch 0, a "11" onto branch 3, etc.

However, this sequence is freely variable by means of the branching vector $V_A$, whereby the respective even numbered and odd numbered branches could be exchanged with one another by means of $V_A = 1$, for example, whereby a different branching structure results.

Similarly, in this case the transliteration vector for all nodes was chosen to be $V_K = 0$, whereby each node assigns the crypting indices to those branches that have been once determined in the list. However, this determination is freely variable by means of the transliteration vector $V_K$: thus, for example with $V_K = 1$, the crypting indices of neighboring branches might be exchanged with one another, whereby a different cryption code results.

To carry out the cryption in such a branching network, the characters of an input message select node-wise and serially the branches of the branching network, thereby selecting a specific cryption path through the network on which the output message will be formed, dependent on the crypting indices of the nodes and branches through which the messages pass. In this procedure, the length of the input message blocks to be subjected to crypting, is unlimited and independent of the node count of the network. However, this node count determines the power or magnitude of the code space and thereby the periodicity of the encoding. The encryption of an input message can begin at any desired node which, however, is then obligatory for the decryption.

Thus, two parameters characterize the branching network: the number n marks the number of nodes of the network, and the starting node $A_S$ for the encryption of a datablock.

For the example of FIG. 2 with n = 4 nodes and starting at address 0, a six bit input message 110011 causes a cryption path through the nodes 0-2-3-0-3-1 and thereby an output message 010110.

In contrast thereto, with a branching vector $V_A = 1$ for node 0 a differently branched cryption path would result over the nodes 0-3-1-3-1 resulting in the output message 111010.

A cryption vector $V_K = 1$ for node 2 for the same cryption path 0-2-3-0-3-1 would change the output message to 000110, which means, it simply results in a different cryption code.

Datablocks of which the last bit to be transliterated, as in this example, is present at a node having more than two branches, are completed or complemented by the required bit number, for example, by appending 00 ..., whereby correspondingly only one bit of the received output message is to be evaluated.

The example shows that a bit of the output message encoded according to this method is dependent on the sum of all previous bits of the input message, that is, the changing of a single bit of the input message has an effect on all the following bits of the output message. This effect is called an avalanche effect. For this purpose it is a prerequisite that the branches extending away from a node have different target nodes. This avalanche effect is effective on all the bits of the crypted message, specifically it is also effective on the preceding bits, if the output message obtained after one runthrough is crypted several times with a respective reversal of the bit sequence each time.

The present branching network shown in FIG. 2 as a tabular list has been realized in the form of stored information by hardware or software; whereby the memory storage space required, according to FIG. 2 for a general example, can be reduced if the intended application does not require all the depicted degrees of freedom. FIG. 4 shows by way of a table, a memory which forms with n cells the n nodes of a branching network having respectively two branches per node; as shown in FIG. 6. By fixing a single common number of branches for all of the nodes, the node index N is made superfluous.

Two different target addresses A0 and A1 selected randomly from n addresses, are entered as branches into each cell of the memory, whereby each of the n possible linked together target addresses are only to occur two times and each address pair A0/A1 shall occur only once.

This determination makes possible (n − 1)!(factorial) different branching networks combinable with respectively $2^n$ different cryption indices K.

The branch with the target address A0 is generally selected by the bit "0" of the input message, whereby a branching vector $V_A$ becomes superfluous.

The similarly randomly selected cryption index K is fixedly allocated to the branch A0, whereby a cryption vector $V_K$ becomes superfluous.

For the intended application for a message cryption the memory space required for the branching network is to be further reduced to only a few parameters which determine the code space and the cryptological characteristics of the branching network.

Only the cryptological characteristics of the nodes and not of the cell addresses are determinative for the cryptological characteristic of the branching network. The same branching network of FIG. 4 is realized as a chain of sequentially arranged nodes which are interconnected by a respective first branch A0 and which are networked together by a respective further branch A1 to other desired nodes. FIG. 5 tabularly shows the memory storage and FIG. 7 shows the branching network in a stretched-out chain depiction. Each node of the network has its own individual cryptological characteristic which is determined by its own cryption index and by the characteristic of all of the following nodes, which means that the cryptological characteristic of the network depends on its spacial or local position in the branching network.

FIG. 5 shows that the chain forming target address A0 does not require a memory space because it can be derived from the respective current cell address, here A0=cell address plus 1.

The illustration of FIG. 5.1 is the result and shows all of the cryptological characteristics of the branching network and of the code space. The code space is determined by the cryption indices K and the target addresses A1 which determine the local position of a node relative to the other nodes n. For example, n nodes with two branches each, that is a target branch A1 and i-bits per node as the cryption index K, provide a code space of $$2^{i \cdot n} \cdot (n-1)! \text{(factorial)}.$$

In this context each target address A1 shall occur only once and shall not name the immediately following node, whereby the i cryption indices require i cryption sections, see below.

The principle is not limited to one target branch A1, namely a target address A1 per node, since many N target branches A1, A2, A3, . . . may be realized, as desired, whereby even each node may be an individual node. In this context the chaining principle always holds true for the first non-stored branch A0. Corresponding to the number of target branches N the cryption index K and a sign of the input message for a selecting section, comprise several bits. Such a multibranch method thereby applies crypting of several bits of the input message simultaneously; which is advantageous with respect to the cryption speed.

Because both the cryption index K and the target addresses A1 . . . determine the code space, it is possible to reduce the memory space for the branching network, that is for the code, if desired, provided one of the two influential values is given as a fixed value and therefore does not have to be stored in the memory as a code.

The cryption index K can be left out, if it is calculated or derived from the target address A1 by means of a prescribed function $f_K(A1)$, for example, as the lowest value bit of the target address A1; whereby $n=2^A$ nodes require a memory space of n.A bits and provide a code space of $(n-1)!$(factorial).

The target address A1 can be left out, if it is derived, for example similarly to the following address A0, as a prescribed function $f_{A1}(Z)$ from the respective present node address Z and/or from the selector step sequence. For example, for $n=2^A$ nodes from $A1=Z+2^{A-s}$, whereby s counts the respective selector step: $s=1, 2, 3 \ldots$ to $(A-1), 1, 2, 3, \ldots$, etc.

Thus, $n=2^A$ nodes with one bit as a cryption index per node require a minimal memory space of only n bits and provide a code space of $2^n$. Memory cells with an eight-bit memory capacity thereby realize eight nodes so that typical code keys of sixty-four bits can be realized as a branching network in only eight memory cells.

The cryption indices K can be a random information, for example random number generators may provide these indices. The target addresses A1 can be a random scrambling of the cell addresses Z. The method of forming such a branching network out of the nodes chained to one another is simple: out of many memory cell addresses 1-n one random address is respectively removed and is entered into a respective cell of the memory cells 1-n. In order to secretly produce such networks in a memory, randomly selected memory cell addresses can be blindly written into randomly selected memory cells.

The following parameters characterize such a network:

the number n of the nodes of the network,
the target addresses A1 of the nodes,
the node indices N,
the cryption function $f_K(A1)$,
the branching function $f_{A1}(Z)$,
the starting node $A_S$ for cryption.

The same branching network carries out the cryption in both cryption directions in that the same cryption path is run through in the branching network for encrypting and for decrypting. Merely the coupling or networking of the input message with the node information for reproducing the original information and the target addresses are different.

The given functions $f_K(A1)$ and $f_{A1}(Z)$ may be the same for all nodes of the network, as above, or they may be selected differently in a node-individual manner, whereby, these given functions offer the possibility of changing the cryptological characteristics and the branching structure uniformly for all nodes or in a node-individual manner. These changes may be carried out, for example, after a cryption run, after a cryption section, see below, after each input message, or dependent on external processes.

The fully available above mentioned code space is used by input messages having a number of characters sufficient to reach all nodes of the branching network. Input messages with a number of characters $m < n$ use less than the capacity of this code space dependent upon the random branching. By purposely arranging the branching, for example, by the above function for A1, all maximally possible nodes can be used for $m < n$. However, the proportion factor of the target addresses in the code space is reduced thereby.

Random target addresses A1 and random cryption indices K provide a random code key from the code space with random characteristics. If special applications require special code key characteristics, then the code space is correspondingly reduced. For example, if it is called for that crypted input messages of unlimited length are continuously and repeatedly crypted with an unlimited periodicity, then this may be achieved by restricting conditions for the random selection of the target addresses and the cryption indices, for example: target branch $A1=Z+2$ for all nodes 0 to (n-1), except (for starting node $A_S=0$)

| | |
|---|---|
| Node 1: | A1 = 3 |
| Node 2: | A1 = 1 |
| Cryption index K0 = 1 | |

-continued

| Cryption index K1 = K2. |

The above remarks show that branching networks according to this method realize any desired code space. The networks simply require the minimum memory space of n bits basically required for a code space $2^n$. In the following it is explained how a code space realized by means of a branching network can be maximally used for messages of limited length.

Messages with an m bit length make possible $2^m$ variations and therewith $2^m!$ (factorial) possible different scrambling variants for encodings. For typical message lengths of, for example, 64 bits, less than the full capacity of this code volume is realized in a code space. However, for messages of only a few bits it is often desirable to achieve a full utilization of this code volume. A message of, for example three bits, makes possible, for example 40320 codes or scramblings which may be realized through crypting by means of a branching network.

The input message in this "maximal crypting" is crypted characterwise in several passages and with an individual code key for each character position. Thus, the character position with its associated number of possible scramblings, determines the magnitude or power of this code key allocated to this character.

An example for a message with n=3 bits will now be described.

The message makes possible $2^3! = 40320$ scramblings. A branching network with a total of $2^m - 1 = 7$ nodes with $7 \times 3 = 21$ bits as cryption indices for the three bit positions, is required. The target addresses A1 of the branching network are calculated from the node addresses according to the above described function:

$$A1 = Z + 2^{3-s},$$

whereby the target address is significant for the three selector steps $A1 = Z+4; A1 = Z+2; A1 = Z+4$.

The message is encrypted in three cryption sections with three different code keys which are divided into pass-individual partial code keys for each pass or run-through per section. FIG. 9 shows in a table the cryption procedure separated into sections and passes along with the bit sequence respectively, corresponding to the passes. This method achieves for the bit positions 1/2/3, the corresponding number of scramblings 70/36/16, and thus achieves overall the maximum code key volume for m=3 of $70 \times 36 \times 16 = 40320$.

For typical encoding applications with typical message lengths, the described cryption parameters may be considerably reduced to desirably reduce the required code space.

EXAMPLE 1

A message having a length m=64 bits, is divided into two cryption sections each with 32 bits. Three passes or run-throughs for each cryption section are performed with a respective reversal of the bit sequence. A branching network with n=64 nodes is selected including a code key of 2 bits per node=128 bits as the cryption index K. Target addresses A1 are prescribed by means of a function.

This solution realizes a code space of $2^{128}$ with a memory space of 16 bytes.

A realization by means of fast semiconductor memory components, which internally process these 16 bytes in parallel, shows that the present teaching is magnitudes faster than conventional cryption methods.

EXAMPLE 2

A message having a length m=64 bits is divided into six cryption sections with each having 10(4) bits. Three passes or run-throughs for each cryption section are performed with a respective reversal of the bit sequence. A branching network with n=64 nodes is selected including a code key of 6 bits per node=384 bits as the target address A1, and a cryption index K equal to an allocated bit from A1 for each section.

The solution realizes a code space of 63!(factorial) with a memory space of 48 bytes.

If the foregoing teaching is realized in a semiconductor memory which internally processes 16 bytes in parallel on each of three lines, then this solution is also considerably faster than methods of the prior art.

All the described methods for message cryption by means of branching networks, have the following essential cryptographic characteristics, namely, completeness, which means that each output bit of a datablock is truly dependent upon each input bit; avalanche effect, which means that changing any desired input bit of a datablock changes on average half of the output bits; nonlinearity, which means that each output bit of a datablock is nonlinearly dependent on each input bit, and correlation immunity, which means that even any random number of datablocks available for the analysis and having a known input and output information, does not make possible a correlation between the two.

The present cryption system will now be described.

A "network memory" organized according to the above described method and including devices for controlling or changing its code keys or code parameter and for controlling the data stream, may be utilized for a substantial number of applications as a cryption system.

Such cryption systems are secure against analytical attacks on the code key because the method is based on memory information which is inaccessible and externally not determinable. Mechanical attacks on the code key by opening the memory chip and analyzing the information structure can be prevented by appropriate memory methods which lose their memory information when an internal analysis of the chip is attempted.

Even though the security of the method rests on the memory stored information, a portion of this code key information can be publicly known, for example, it may be standardized if the respective other portion remains secret.

FIG. 8 shows the block circuit diagram of the present cryption system. The basic elements of an analytically secure cryption of the data stream are shown with heavy lines.

The basis of the cryption system is the network memory NM of which n cells as described above, randomly store the scrambled to n target addresses A1 and/or cryption indices K thereby forming the branching network. This network memory NM can be realized as a fixed value memory; if desired it may be "mask programmed".

The variable code key parameters of this cryption system are: the starting address $A_S$ for the cryption of a datablock, the cryption direction C which determines whether encryption or decryption takes place, the node indices N which determine the number of branches, the number of bits i per cryption section, the number of cryption passes R per cryption section, the bit sequence f(R) for repeated cryption passes, the cryption function $f_K(A1)$, the branching function $f_{A1}(Z)$, the branching vector $V_A$, the length of the cryption datablock m, and the selector characteristic S which encodes the input data.

A parameter memory PM also embodiable as a fixed value memory, stores these code key parameters for a basic cryption mode and loads these basic parameters into the code key register KR on demand.

These given parameters or functions can be changed or varied, for example, by means of externally loading the code key register.

For a branching network of n=64 nodes having each respectively i=2 bit cryption indices per node, the basic parameters could be fixed, for example, as follows: starting address $A_S=0$, cryption direction C=0, which means decryption, N=2 branches for all nodes, R=3 cryption passes for each cryption section, f(R): bit sequence respectively reversed ("first out - last in"), $f_K(A1)$ D0 for branch A0=lowest value bit from A1, branching function $f_{A1}(Z)$: none, branching vector $V_A=0$ for all bits of the branching code key, length of the cryption datablocks m=64 bits, and a selector characteristic S=0: DIN=0 selects branch A0.

The length of the datablock m should not be greater than the number of nodes n of the network, but large enough so that analytical attacks are hopeless.

The cryptological characteristic of the present system is determined by the branching network and a selector characteristic which crypts the currently present characters of the input message into selected branches of the branching network. This selector characteristic which the code key register KR stores as a selector code key, makes it possible, without externally reloading the code key register, to change the cryptological characteristic, for example after each pass or run-through.

The code key register allocates a bit S correspondingly to each of the m bits of the cryption datablock as a selector code key which determines the coding of the affected datablock bit in a selected branch. Stated differently, the code key register determines which input information will select a left branch A0 to the following node and which will select a right branch A1 to a desired target node, for example,

| S = 0: | left branch A0 for DIN = 0, |
| | right branch A1 for DIN = 0, |
| S = 1: | right branch A1 for DIN = 0, |
| | left branch A0 for DIN = 1. |

The selector code key S and the input information DIN of the cryption datablock thus select the respective branch for the bit to be crypted by means of EX-OR-linking.

Because the selector code key is only associated with the currently present character of the input information independently of the currently present node, the same selector code key determines the branching of different nodes in different passes. By varying this selector code key the cryptological characteristic changes. The code key register KR makes possible such a change of the selector code key among other things, after each input message, for example by a continuous count, (1-addition) of the selector code key or another given function with given parameters. A nonlinear change of the selector code key would similarly be possible, for example, by deriving this code key and the cryption indices from a separate cryption apparatus which is linearly variable by means of a counter.

Thus, a selector code key loaded once into the code key register at the beginning of the cryption procedure, forms $2^m$ cryptological characteristics for $2^m$ cryption datablocks. Stated differently, without reloading the code key register KR a periodicity only arises after running through $2^m$ datablocks. However, until then each datablock meets a different individual cryptological characteristic.

Thus, an input message, for example 000—continuously repeated for the same cryption procedure, would only provide a repetition for the crypted output message after $2^m$ cryption passes or run-throughs. This means that it provides singular code keys for a life-long duration. This characteristic can be utilized for pseudorandom generators.

Basically, the m bits of the selector code key are exchangeable with the m bits of the input message, provided that the linkings dependent thereon are correspondingly controlled in the cryption apparatus. This exchange can be carried out bitwise according to a given function.

The address selection AS forms the respective next cell address NADR from the corresponding target address A1 of the network memory, and from the character of the input message DIN after presenting the parameters C, N, $f_{A1}(Z)$, S and AS, for example, for S=0:
  DIN=0: left branch NADR =Z+1
  DIN=1: right branch NADR=A1.

The data cryption DS forms the respective crypted information D0 from the cryption index K or the target address A1 and the character of the input message DIN after presentation of the parameters C, N, S and $f_K(A1)$, for example, for S=0:
  DIN=0 (left branch): D0=lowest value bit of A1 (or index K),
  DIN=0 (right branch): D0=lowest value bit of A1, (or index K) inverted.

The same cryption path is run-through in the network memory NM for both cryption directions, namely encrypting and decrypting. The parameter C controls the cryption direction by correspondingly different data linkings in the address selection AS and in the data cryption DS. This parameter C together with further crypting information may be publicly transmitted, encoded as a non-symmetrical code key, which means it is usable only for one encoding direction.

In a crypted datablock thus formed out of m bits D0, each bit is dependent on the sum of all preceding bits of the input message. Stated differently, changing a single bit of the input message has an effect on all the following bits of the crypted output message. This is the above mentioned avalanche effect.

This linear relationship which makes possible a crypto-analysis in repeatable procedures, is converted by the feed-back register RR into a nonlinear dependency of each output bit on each input bit of the datablock. For this purpose, the return coupling register RR stores the entire crypted datablock and feeds it back into the input after a change f(R) of the bit sequence several times (R) for the purpose of several crypting passes. With the above stated basic parameters, for example, the feedback is performed three times with a respectively reversed bit sequence.

The thus obtained crypted datablock is analytically unbreakable.

It is possible to avoid causing a waste of time that may be caused due to these multiple passes, if for example three passes are carried out in three sequentially arranged network memories NM. All datablocks of a cryption procedure could pass through the cryption without any time delay and with a maximal data rate. The time duration for the accumulation or intermediate storage in the return coupling registers RR which must only be calculated once, would only have an effect on the access time for the output data but would not have an effect on the data rate.

Similarly, for example three sequentially arranged fully autonomous cryption devices could be utilized for this purpose because the method or processing is cascadable.

By means of devices for controlling and changing the code keys, the present cryption can be used by process participants for the encoded data transmission, among others, for the following basic functions: encrypting with a one time code key, also referred to as "one time key"; identification of persons and messages; authorization; non-symmetrical encoding by means of public/secret code keys, for the authentication, for electronic signatures and for issuing electronic receipts. These devices, shown in FIG. 8, are the random generator RD and the register KR1 for generating random keys, the authenticator memory AM for generating an authenticator and the identity index 1D for forming an individual key characteristic.

By stringing together these functions, all the requirements of an encoded data communication can be fulfilled. In the following the basic function for the block circuit diagram 8 will be described in greater detail.

An encoded data transmission by process participants is performed on the basis that all of the code keys which determine the cryption by means of the branching network, are settable as desired, for example by random generation.

This characteristic makes possible the ·completely secret generation and assembly of the entire code key information without expensive and complicated code key management, it also enables the inaccessible storage which is even unknown to the possessor of the code key. For example, storage may take place in an extremely miniaturized semiconductor chip.

Thus, process participants A, B, C, etc. form common code keys as a communication basis by assembling their own individual coincidental partial code keys A, B, C which are being transmitted in encoded form. Code keys may be multiplied as desired by code key-encoding. For example, the code keys may be hierarchically individualized.

In the following the basic functions for encoded or encrypted data transmissions by process participants, are described in greater detail. Thereby the functions for encrypting/decrypting, described above, are comprised in a so-called "key unit".

A mutual authenticity testing of two key units or process participants assures that the two participants A and B communicating with each other possess the same code keys. The testing makes sure that the keys are not falsified and are not tampered with. If one of the two is positively authentic, then for a positive test result the other must also be authentic. The testing is carried out by mutual comparison of the cryption characteristics with as many random data which have been generated by the internal random generator RD as desired. First, A sends encoded random data to B, receives the same random data decoded back from B, and compares them to the original data. Then, B proceeds in the same manner as did A.

The random generators may, for example, be noise generators or asynchronously running fast counters.

The present system also permits data encoding for two participants with common one time keys. Two participants A and B with the same one time keys can exchange encoded data while excluding a third participant by means of commonly generated random one time keys. Thus, in a basic way the functions A and B are technically fixed or determined.

This function of the present system can be used, for example, for cash money substitution which requires a fully system internal, autonomous, secret, and random code key generation.

A mutual authenticity test as described above initiates the communication process and assures that both process participants are authentic and can communicate with each other.

In order to generate the code key, A internally generates arbitrary random data RD, stores these data in a register KR1 and sends the data in an encoded form to B, which decodes the data and similarly stores these data in a register KR1. Then B generates corresponding random data and sends these data in an encoded form to A, and internally links these random data, for example, by means of EXOR-functions with the content of the register KR1. A decodes the random data from B and links them according to the same function with the content of its own KR1 registers.

As a result, both participants have in their KR1 register a commonly generated random information which they load as a code key into the code key register KR and/or into the network memory NM. A and B possess this code key exclusively, third true participants cannot form this code key through "listening in" because they had to respectively form the first or the second half of the code key in the A or B function with their own random information.

The common random code key formed once in this manner is the source of a practically unlimited number of one time keys. In order to achieve this, both participants A and B after each cryption change, for example, their selector key in the code key register. In this manner one time keys can be generated for a practically unlimited operation time.

It would also be possible to use a corresponding part of the respective last received or sent datablocks as the respective new code key.

If the identify of the participants A and B is not positively assured, for example, when the two are not in sight contact, an "identity assured" communication with public code keys or by a "trustworthy third party" can be initiated as described below. Basically, the key unit distinguishes the code key data from the usable data. Transmitted code keys contain coded control information which assures that the code key information is only loaded internally into the code key registers of the key units, but is not made available externally in any event.

Numerous applications require an identity and personal allocation of the key unit to the owner or to the rightful user. In order to achieve this purpose, the key unit may, for example, internally store as an identity index a secret, individual, fully anonymous serial number of the manufacturer which unambiguously distinguishes it from all other key units, for example 32 characters long. This internal secret serial number can be loaded as a participant code key into the code key register KR and/or the network memory NM, whereby the key unit obtains its individual, unmistakable, own characteristic.

The personal allocation of the anonymous key unit presumes an additional personal index or criterion. Such a personal index can, for example, be any desired arbitrary personal identification number (PIN) thought up by the rightful user himself with any desired arbitrary number of characters, for example 4 to 16, which is externally inputtable during use and is internally loaded as a participant code key, for example, linked with the secret serial number I into the code key register KR and/or the network memory NM. In this manner the key unit becomes an unmistakable user individualized cryption key with a user individualized cryption key characteristic.

Thus, this personal allocation does not require any entering of data into a memory nor does it require any other changes of the individual key unit because the PIN is only input for a respective use, as will be described below with reference to an authorization. Therefore, the same key unit may be personally allocated to several rightful users for different applications. The linked or coupled allocation of several users is also possible. Stated differently, only the PINs of several users inputted in the correct sequence, reproduce a specific unmistakable cryption key characteristic.

An authorization is the "admission to a partial process", for example, the admission given by a bank or a credit card institute to a key unit as a "money purse" for payment exchanges with similarly authorized "money purses".

The key unit makes possible the authorization of any arbitrary number of "partial processes" without storing additional data or other changes. Stated differently, it enables such authorization in an embodiment which is once set up and not changeable. As a result, any arbitrary number of institutions can authorize the same key unit for their specific uses completely independently from one another and without any prior understanding. Just as biometric recognition characteristics are to be seen as unchangeably given, the key unit can also be seen as an unchangeable "given".

The steps of "authenticity testing" and "generation of common random one time code keys" precede the authorization.

By means of a key unit the authenticity of which is positively assured, the authorizing party uses this preceding step to form the basis for an encoded data exchange which is completely secret even to him, with the participant to be authorized. This data exchange may also be carried out over public communication means.

The authorization comprises making it possible for the participant to form a secret process code key P which is common to all the authorized parties and which identifies all those authorized for the partial process.

In order to achieve this, the new participant receives the encoded secret process code key P and encodes it with his individual participant code key I which may be personified as the case may be by one or more PINs, into a process code key AN allocated to the participant which he must keep in mind as an admission code key to the pertinent partial process.

Upon inputting his individual process code key AN, his key unit provides access to the process in that it encodes it by means of its participant code key, into the common secret process code key P, and loads P into the code key register KR and/or into the network memory NM.

This process individualized process code key P, which is common to all authorized participants, makes it possible for a participant to be recognizable by all authorized participants, as being authorized. Recognition involves an authenticity test as described above. Thus, a participant can communicate with other authorized participants in an encoded manner, and based on this process code key, may generate, if desired, one time code keys for an exclusive two-way communication as described above.

The described authorization which is similarly possible between only two communication partners with mutual polling or understanding, opens up the possibility of generating public code keys and to publicly transmit these keys as described below.

If the participant code key for the authorization was personalized by means of one or more PINs then the process code key AN allocated to a participant, is only usable in conjunction with this PIN. This feature has the advantage that the user, for example, need only secretly remember a single PIN for an arbitrary number of many authorizations, while making publicly accessible notes for the arbitrary number of ANs. Thus, AN has thereby become a PAN (Personal Authorization Number). The notation of these PANs can also be carried out in an openly operated additional memory for example, arranged by association with the name of the process.

By means of different PINs and therewith different PANs, for example, an "electronic money purse" for the same process may be authorized by the same authorizer even for several users.

It is also possible to authorize the same "money purse" repeatedly by the same issuer, that is, for different partial processes. For example, in this manner authorizations may be issued by means of different process code keys P for services rendered or for certain money transaction limits which, for example, are authorized to different users in conjunction with the different PINs. In the same manner, it is possible to achieve a separation of, for example, "private money" and "business money" with, for example, the same PIN.

The formation of non-symmetrical public code keys for identification will now be described.

Public code keys are "non-symmetrical", they are accessible to anyone, but only enable respectively one cryption direction, whereby they are either transmitter code keys for encoding (encrypting) or receiving code keys for decoding (decrypting). The code keys for the respective other cryption direction are exclusively in the possession of the rightful possessors, whereby they are bound to a specific identity. A rightful possessor can thereby positively identify himself relative to others as a transmitter or a receiver of a message by means of the possession of a secret transmitting or receiving code key.

Non-symmetrical code keys for only one prescribed cryption direction can be generated from symmetrical code keys in that these are, for example, linked with a control information for the cryption direction which is to be blocked. This control information is the parameter C which is transmitted in an encoded manner together with the other parameters.

Code keys are transmitted in an encoded form as a matter of principle. These code keys are recognizable as such by means of a control information which upon receipt, exclusively enables the internal loading of the code key register and/or of the network memory. The external release of the encoded code key informations is not possible.

Participants with the same cryption characteristic, for example, similarly authorized participants as described above can generate "public" code keys which are publicly and openly accessible for the respective group of participants. This code key formation is achieved by means of an authorization procedure.

The participant encodes a common public process transmission code key P1 or process receiving code key P2 by means of its participant code key I, into a participant allocated symmetrical secret transmission code key AN1 or AN2.

The participant derives its non-symmetrical individual transmitting or receiving code keys from these symmetrical secret code keys AN1 or AN2 through linking or coupling with a transmitting or receiving control information (parameter C). The participant's non-symmetrical individual transmitting or receiving code keys are encoded by means of a secret code key, for example P, which is provided to all process participants, into a publicly transmitting or receiving code key AC1 or AC2.

These public code keys may be publicly handled like a telephone book or, for example, may be provided along with the encoded messages. To carry out a communication by means of a public code key of another participant, a participant first acquires access to the process by means of his own process code key AN, namely, the common secret process code key P which then decodes for him the public transmitting or receiving code keys AC1 or AC2 and loads them into the code key register or the network memory.

The respective entitled or rightful participant loads his individual secret, receiving or transmitting code keys AN1 or AN2 by inputting the common public transmitting code key P1 or receiving code key P2 and by crypting with the aid of his participant code key I. The "public status" of these common transmitting or receiving code keys permits the loading of the secret code keys AN1 or AN2 by means of these public code keys P1 or P2 by the rightful possessor and even by the communication partner.

The code keys AN1 or AN2 remain secret because they are reproduceable only internally in the key unit of the rightful participant by means of his participant code key.

These public transmission and receiving code keys make possible any desired type of identification. A participant A identifies himself by transmitting with his secret code key and is identifiable by all participants by means of the public code keys. A participant A receives messages encoded with public code keys from other arbitrary participants, whereby only he, identifying himself therewith, can decode the messages.

An authentication is to provide proof of the genuineness and completeness of a message. For this purpose a comparative value (authenticator) is derived from the transmitted text and appended to the text which is unambiguously correlated to the transmitted text, for positively identifying the text. This comparative value must be extractable from the received text by the receiver for making it possible to prove the genuineness and completeness of the received message by comparing with the concurrently provided authenticator.

The described encrypting/decrypting method generates an allocated authenticator which is secure against falsification, simultaneously with the data encoding with little effort and expense.

In order to achieve this purpose a label bit is allocated to each node or a node group of the branching network in a register or memory AM for forming a basis information for the authenticator. Stated differently, this memory is addressed by the respectively selected target address NADR just like the branching network is addressed. To start a data encoding procedure, this memory AM is loadable with a defined label information, for example 000—0.

During the course of the encoding which can extend over several datablocks, each culled node carries out an inversion of its label bit so that at the end of a message a text-and encoding-individual label is available in the memory AM as a basis for forming the authenticator. This label of, for example n bits for a branching network with n nodes, is added to the text as an authenticator either directly or reduced by means of linking or folding, also encoded with the transmitting code key.

Each receiver who possesses the receiving code key reproduces this authenticator during the course of the decoding which runs through the same nodes of the branching network and obtains proof of the genuineness and completeness of the message by comparing with the received authenticator.

An electronic signature is achieved if the transmitting code key is secret and bound to a specific identify. In that case, the authentication amounts to an "electronic signature" because its origin is then positively fixed and cannot be denied as genuine by the person who produces it. As an authenticator, a "meaningful" signature may also be transmitted in this case, for example, name, address, place where the signature was made, date, etc. In this case, the transmitter of the message loads the label AM into the code key register KR and encodes this "meaningful" signature with this transmitter and text individualized code key and appends it to the text as an authenticator as described above.

The receiver forms in the same manner by means of the text, the code key to be loaded into the code key register KR for decoding the signature. This solution makes possible an appearance of the signature which looks always the same.

The electronic signature and authentication are not bound to the encoding of the transmitted text. Even clear texts are electronically signable and authenticatable by means of the described encoding in that the sender adds the authentication to the clear text by means of the encoding procedure and sends it to the receiver in an encoded form as a corresponding signature; and, if applicable, together with his corresponding public code key.

An electronic receipt can be provided just as the electronic signature of a transmission. The receipt is authenticated as described above.

The receiver uses the label AM formed for the received text or passes it on along with the confirming text, and forms with it, as described above, an authenticator for the text and confirmation and sends it encoded with his own secret transmitting code key to the communication partner as a receipt, if applicable, together with his corresponding public code key. Just like the received signature, this receipt cannot be denied by the one who produced it. As described above in this case also a "meaningful" signature can be used as the authenticator for a receipt.

The present method and system as described above makes possible multi-functional, cost efficient cryption devices which offer all of the cryptographic functions with a practically unlimited number of code keys in the form of a microchip with a minimally small chip surface. Extremely high data rates are possible because this method does not use costly computation operations, but rather uses memory operations.

The present cryption devices are usable as random generators for message transmissions with a practically unlimited periodicity. These devices make possible an unbreakable encoding using one time code keys (one time key) with unlimited supply of code keys for the operational life of the device.

The broadest fields of application at this time are the "electronic banking and payment services", the "telecommunication services" and the "electronic access and data securing" services. Common to these fields of application is the group of problems "authorization", "identification", "authentication", and "encoding" of identities and messages. Devices according to the described method present themselves for this group of problems as multifunctional technical solutions common to all of the applications.

For example, the present cryption system or device may be combined with a balance counting and memory means to form an authorized "electronic money purse" for "authenticatable money" which can exchange fully autonomously and secretly encoded amounts of cash money values with equally authorized "money purses" or exchanges.

Especially advantageous is the realization as a fixed value memory, whereby the present system can be produced in the form of unchangeable microchips of which the information content remains unchanged from the time of production. No lasting or durable information is written into these chips during the entire practically unlimited life duration of the microchips. The conceptualized method can also be realized as a software or firmware solution.

Although the invention has been described with reference to specific example embodiments, it will be appreciated that it is intended to cover all modifications and equivalents within the scope of the appended claims.

I claim:

1. A method for encrypting and decryption messages by means of a branching network, comprising the following steps:
   (a) defining said branching network as a plurality of addressable nodes, said nodes being allocated to a key information for encrypting/decrypting an input message into an output message;
   (b) generating sets of target addresses for linking one node as a source node to a set of target nodes, each target address set comprising a first target address and at least one second target address;
   (c) performing a selection run as a sequence of selection steps, each selection step selecting at least one target address out of a target address set on the basis of a currently active character of said input message;
   (d) generating said target address sets for forming a chain of said addressable nodes by generating said first target addresses and cross-linking said node chain to said branching network by generating at least said second target addresses, said branching network carrying a key characteristic on the basis of said key information and said generated target address sets, and
   (e) selecting with said selection run step-by-step, said target nodes on the basis of said currently active characters of said input message, thereby selecting said allocated key information for forming an encrypted/decrypted output message.

2. The method of claim 1, further comprising: generating said target address set on the basis of said selected key information, selected in a preceding selection step.

3. The method of claim 1, further comprising: generating said target address set on the basis of said selected target address, selected in a preceding selection step.

4. The method of claim 1, further comprising: generating said target address set on the basis of a counting number of said selection step.

5. The method of claim 1, further comprising: generating said target address set on the basis of said selected target address selected in a preceding selection step by means of an address step, said address step being "one" for said first target address, and said address step being $2^{A-s}$ for said second target address, wherein A is a value depending on the quantity of said addressable nodes and s is a counting number depending on said selection step.

6. The method of claim 1, further comprising: generating said key characteristic on the basis of random events.

7. The method of claim 1, further comprising: generating said key characteristic as an information on the basis of a separate process.

8. The method of claim 1, further comprising:
   (a) forming a selection key, comprising at least one character of an information as a selecting character;
   (b) allocating said at least one selecting character to at least one character of said input message; and
   (c) linking said currently active character of said input message with said allocated selecting character for selecting said target address.

9. The method of claim 1, further comprising:
   (a) forming an authenticator key comprising key characters of an information; allocating said nodes to said key characters;
   (b) changing said key characters while running said selection run with selection of said allocated nodes; and
   (c) forming an authenticator on the basis of said changed authenticator key after completing at least one of said selection runs.

10. The method of claim 9, further comprising: forming a key for encrypting/decrypting a message on the basis of said authenticator key.

11. A method of encrypting/decrypting messages by means of selection runs through a branching network carrying a key characteristic, comprising the following steps:
    (a) defining said encrypting/decrypting as a process, said process encrypting/decrypting by means of a key in at least one procedure a process input message into a process output message, whereby said key characteristic is formed on the basis of said key;
    (b) defining at least one section key as a portion of said key, and allocating said section key to said procedure;

(c) defining at least one partial key as a part of said section key, and allocating said partial key to a respective selection run of said selection runs;

(d) performing said procedure by encrypting/decrypting in at least two of said selection runs, by means of said partial keys, characters of a procedure input message into characters of a procedure output message, whereby an input message of a next selection run is based on said encrypted/decrypted output message of a preceding selection run with an individually changed sequence of said characters; and (e) dividing said process of encrypting/decrypting into at least one said procedure allocated to at least one character of said process output message, dividing said key into at least one said section key and encrypting/decrypting said process input message by means of said key, procedure-by-procedure, into said process output message by forming in said section by means of said procedure key at least one said allocated character for said process output message, whereby said procedure input message of a next procedure is based on said procedure output message of a preceding procedure.

12. The method of claim 11, further comprising:
(a) defining key units A, B, . . . , said key units comprising at least said method;
(b) defining a mutual test of the key authenticity of at least two said key units A and B, said key units being allocated to an identical key;
(c) generating a test information TA, for encrypting/decrypting into a message TA1 by means of said key unit A;
(d) generating a test information TB, for encrypting/decrypting into a message TB2 by means of said key unit B;
(e) in a first test step, said key unit B receiving said information TA for encrypting/decrypting into a message TB1 and transmitting said message TB1 for evaluating with said information TA1 for a first authenticity proof; and
(f) in a second test step, said key unit A receiving said information TB for encrypting/decrypting into a message TA2 and transmitting said message TA2 for evaluating with said information TB2 for a second authenticity proof.

13. The method of claim 11, further comprising:
(a) defining key units A,B, . . . , said key units comprising at least said method;
(b) defining at least two linkage procedures A and B for linking at least two keys KA and KB into a key K as a common key for at least two key units A and B;
(c) generating said key KA, said key unit A linking, by means of said linkage procedure A, said key KA with said key KB to form said key K; and
(d) generating said key KB, said key unit B linking, by means of said linkage procedure B, said key KA with said key KB to form said key K.

14. The method of claim 11, further comprising:
(a) defining a key unit, said key unit comprising at least said method;
(b) defining said key unit as a participant for at least one process;
(c) defining at least one participant Key I, said key I being allocated to at least one said key unit for identifying said key unit for any process;

(d) defining at least one user key PIN1, said key PIN1 being allocated to at least one user, using said key unit as an access key to at least one process;
(e) defining at least one user participant key ID1, allocated to said user and to said key unit, identifying said user for any process;
(f) authorizing said user of said key unit by encrypting within said key unit said key I into said key ID1 by means of said key PIN1, and identifying said authorized user by decrypting, within said key unit, said key ID1 into said key I by means of key PIN1.

15. The method of claim 11, further comprising:
(a) defining a key unit, said key unit comprising at least said method;
(b) defining said key unit as a participant for at least one process;
(c) defining at least one participant key I, said participant key I being allocated to at least one said key unit identifying said key unit for any process;
(d) defining at least one process key P, said key P being allocated to a process as a key for encrypting/decrypting;
(e) defining at least one participant process key AN, said key AN allocated to said key unit and to said process as an access key for said key unit to said process key P;
(f) authorizing said key unit for said process key P by encrypting, within said key unit, said key P into said key AN by means of said participant key I, and generating within said authorized key unit said process key P by decrypting said key AN into said key P by means of said participant key I.

16. The method of claim 15, further comprising:
(a) defining at least two said key units 0 and 1, authorized for an identical process;
(b) defining at least one participant key Io, said key Io being allocated to a key unit O as a key for encrypting/decrypting.
(c) defining at least one process participant key ANo, said key ANo being allocated to said process and to said key unit O as an access key for said process to said participant key Io;
(d) authorizing said process for said key Io by encrypting, within said key unit O, said key Io into said key ANo by means of said key P, and generating within said key unit 1 said key Io by decrypting said key ANo into said key Io by means of said key P and by generating said key P by means of said key AN.

17. The method of claim 16, further comprising: linking said key Io with a control information, said control information restricting said participant key Io as a key for either encrypting or for decrypting.

18. A system for encrypting/decrypting messages, comprising a branching network,
memory means including addressable memory cells as nodes for forming said branching network, said memory cells being allocated to key information for encrypting/decrypting an input message into an output message;
addressing means for generating target address sets, said target address set for linking one memory cell as a source cell to a set of memory cells as target cells, each target address set comprising a first target address and at least a second target address;
selecting means for selecting at least one target address out of each target address set on the basis of a currently active character of said input message;

said addressing means forming a chain of said memory cells by generating said first target addresses and cross-linking said memory cell chain to a memory cell network by generating at least said second target addresses; said memory cell network carrying a key characteristic on the basis of said key information and on the basis of said generated target address sets; whereby said selecting means select said target cells in a selection run, step-by-step, on the basis of said currently active characters of said input message, thereby selecting said allocated key information for forming an encrypted/-decrypted output message.

19. The system of claim 18, wherein said addressing means generate said target address set on the basis of said selected key information selected in a preceding selection step.

20. The system of claim 18, wherein said addressing means generate said target address set on the basis of said selected target address selected in a preceding selection step.

21. The system of claim 18, wherein said addressing means generate said target address set on the basis of a counting number of said selection step.

22. The system of claim 18, wherein said
means for generating said target address sets on the basis of said selected target address, selected in a preceding selection step, generate said address sets by means of an address step, said address step being "one" for said first target address, and said address step being $2^{A-s}$ for said second target address, wherein A is a value depending on the capacity of said memory means and s is a counting number depending on said selection step.

23. The system of claim 18, further comprising: means for generating said key characteristic on the basis of random events.

24. The system of claim 18, further comprising: means for generating said key characteristic as an information on the basis of a separate process.

25. The system of claim 18, wherein:
said addressable memory cells are arranged in units of lines and columns to form at least one matrix; wherein said addressing means generate a plurality of said target address sets with at least one address step for addressing at least one said unit; and wherein said selecting means select in said at least one unit a plurality of said memory cells by performing at least one selecting step on the basis of a currently active character set of said input message for selecting a set of said allocated key information.

26. The system of claim 18, wherein said selecting means comprise a selection key, said selection key comprising at least one character of an information as a selecting character which is allocated to at least one character of said input message for linking said currently active character of said input message with said allocated selecting character for selecting said target address.

27. The system of claim 18, comprising further means forming an authenticator key comprising key characters of an information for allocating said memory cells to said key characters for changing said key characters while running said selection run with selection of said allocated memory cells and for forming an authenticator on the basis of said changed authenticator key after completing at least one said selection run.

28. The system of claim 27, further comprising means for forming a key for encrypting/decrypting a message on the basis of said authenticator key.

29. A system for encrypting/decrypting messages, comprising a branching network carrying a key characteristic for performing selection runs,
process control means for controlling a process of said encrypting/decrypting, whereby a process input message is encrypted/decrypted by means of a key in at least one procedure, into a process output message and whereby said key characteristics is formed on the basis of said key;
at least one section key as a portion of said key allocated to said procedure;
at least one partial key as a part of said section key allocated to said selection run; said process control means further controlling said procedure for encrypting/decrypting in at least two said selection runs, by means of said partial keys, characters of a procedure input message into characters of a procedure output message, whereby an input message of a next selection run is based on said encrypted/-decrypted output message of a preceding selection run with an individually changed sequence of said characters, and wherein said process control means further control said process by dividing said process of encrypting/decrypting into at least one said procedure allocated to at least one character of said process output message, and by dividing said key into at least one said section key and encrypting-/decrypting said process input message by means of said key, procedure-by-procedure, into said process output message by forming in said procedure, by means of said section key, at least one said allocated character for said process output message, whereby said procedure input message of a next procedure is based on said procedure output message of a preceding procedure.

30. The system of claim 29, further comprising a number of key units each key unit comprising at least said system; at least two said key units A and B being allocated to an identic key for mutual testing of the key authenticity,
said key units comprising
means for transmitting, receiving and evaluating test information;
means for generating a test information TA for encrypting/decrypting into a message TA1 by means of said key unit A;
means for generating a test information TB for encrypting/decrypting into a message TB2 by means of said key unit B; whereby, in a first test step, said key unit B receives said information TA for encrypting/decrypting into a message TB1 and transmitting said message TB1 for evaluating with said information TA1 for a first authenticity proof, and whereby, in a second test step, said key unit A receives said information TB for encrypting/decrypting into a message TA2 and transmitting said message TA2 for evaluating with said information TB2 for a second authenticity proof.

31. The system of claim 29, further comprising a number of key units, each key unit comprising at least said system, wherein at least two of said key units A and B are provided for using a common key K, said key units further comprising control means A and B for generating keys KA and KB and for controlling of at least two linkage procedures A and B; whereby said key KA is generated by controlling said key unit A for linking, by means of said linkage procedure A, said key KA with said key KB into said key K, and whereby said key KB is generated by controlling said key unit B for linking, by means of said linkage procedure B, said key KA with said key KB into said key K.

32. The system of claim 29, further comprising a number of key units, each key unit comprising at least said system, wherein at least one of said key units forms a participant for at least one process,
  said at least one key unit comprising
    means for storing at least one participant key I, said key I being allocated to at least one key unit, identifying said key unit for any process;
    means for receiving at least one user key PIN1 allocated to at least one user for using said key unit as an access key to at least one process;
    means for receiving and transmitting at least one user participant key ID1 allocated to said user and to said key unit for identifying said user for any process, and for authorizing said user for said key unit by encrypting within said key unit said key I into said key ID1 by means of said key PIN1, and identifying said authorized user by decrypting within said key unit said key ID1 into said key I by means of said key PIN1.

33. The system of claim 29, further comprising at least one key unit,
  said key unit comprising at least said system, wherein said key unit forms a participant for at least one process, said key unit comprising:
    means for storing at least one participant key I, said key I being allocated to at least one said key unit identifying said key unit for any process;
    means for receiving at least one process key P allocated to a process as a key for encrypting/decrypting;
    means for transmitting and receiving at least one participant process key AN allocated to said key unit and to said process as an access key for said key unit to said process key P and for authorizing said key unit for said process key P by encrypting within said key unit, said key P into said key AN by means of said key I, and generating within said authorized key unit said process key P by decrypting said key An into said key P by means of said key I.

34. The system of claim 33, further comprising:
  at least two said key units 0 and 1, authorized for an identic process, comprising
  means for receiving at least one participant key Io allocated to a key unit 0 as a key for encrypting/decrypting;
  means for transmitting and receiving at least one process participant key ANo allocated to said process and to said key unit 0 as an access key for said process to said participant key Io for authorizing said process for said key Io by encrypting within said key unit 0, said key Io into said key ANo by means of said key P, and generating within said key unit 1 said key Io by decrypting said key ANo into said key Io by means of said key P and by generating said key P by means of said key AN.

35. The system of claim 34, further comprising:
  means for linking said key Io with a control information for restricting said participant key Io as a key for either encrypting or for decrypting.

36. The system of claim 29, further comprising a number of key units, each key unit comprising at least said system, said key unit further comprises
  means for an encrypted transmitting and receiving of cash amounts;
  means for storing and balance counting said cash amounts, whereby
  said key unit performs storing and balance counting cash amounts and adding up said cash amounts by transmitting and receiving encrypted cash amounts.

* * * * *

UNITED STATES PATENT AND TRADEMARK OFFICE
CERTIFICATE OF CORRECTION

PATENT NO.  : 5,224,164

DATED       : June 29, 1993

INVENTOR(S) : Peter Elsner

It is certified that error appears in the above-identified patent and that said Letters Patent is hereby corrected as shown below:

ON THE TITLE PAGE:
Replace the title to read: --METHOD AND SYSTEM FOR ENCRYPTING AND DECRYPTING MESSAGES--;

Column 19, line 20, replace "section" by --procedure--, replace "procedure" by --section--;

Column 22, line 11, replace "characteristics" by --characteristic--;

Column 24, line 6, replace "An" by --AN--.

Signed and Sealed this

Twenty-ninth Day of March, 1994

Attest:

BRUCE LEHMAN

Attesting Officer

Commissioner of Patents and Trademarks